June 26, 1945.   L. O. CARLSEN   2,378,980
DRESSING MECHANISM
Filed March 1, 1943   8 Sheets-Sheet 5

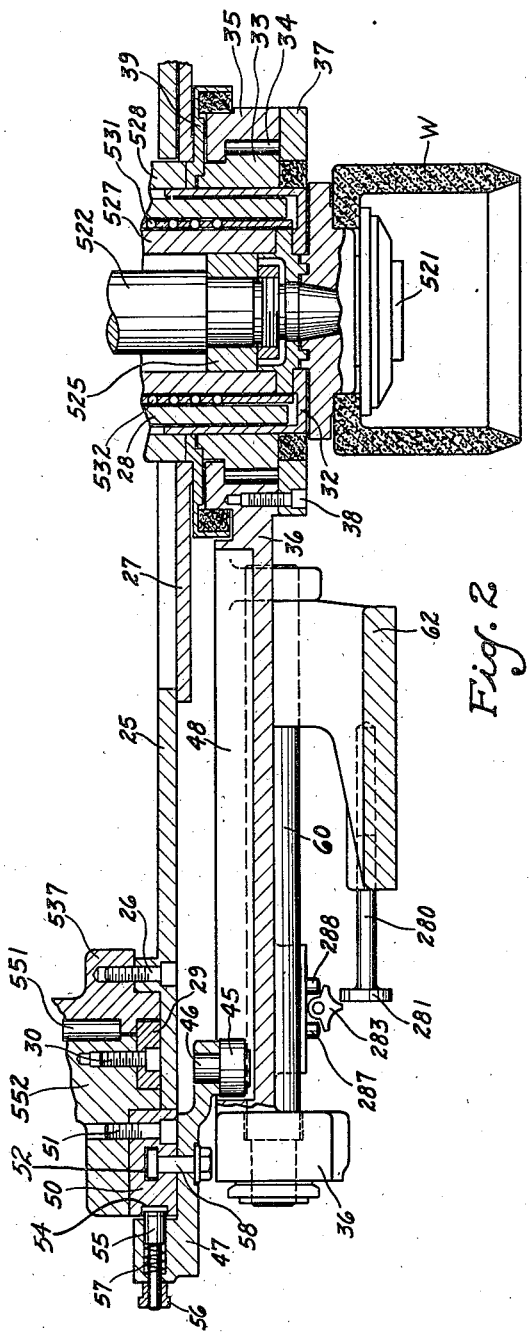
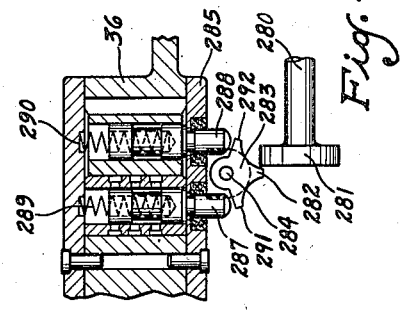

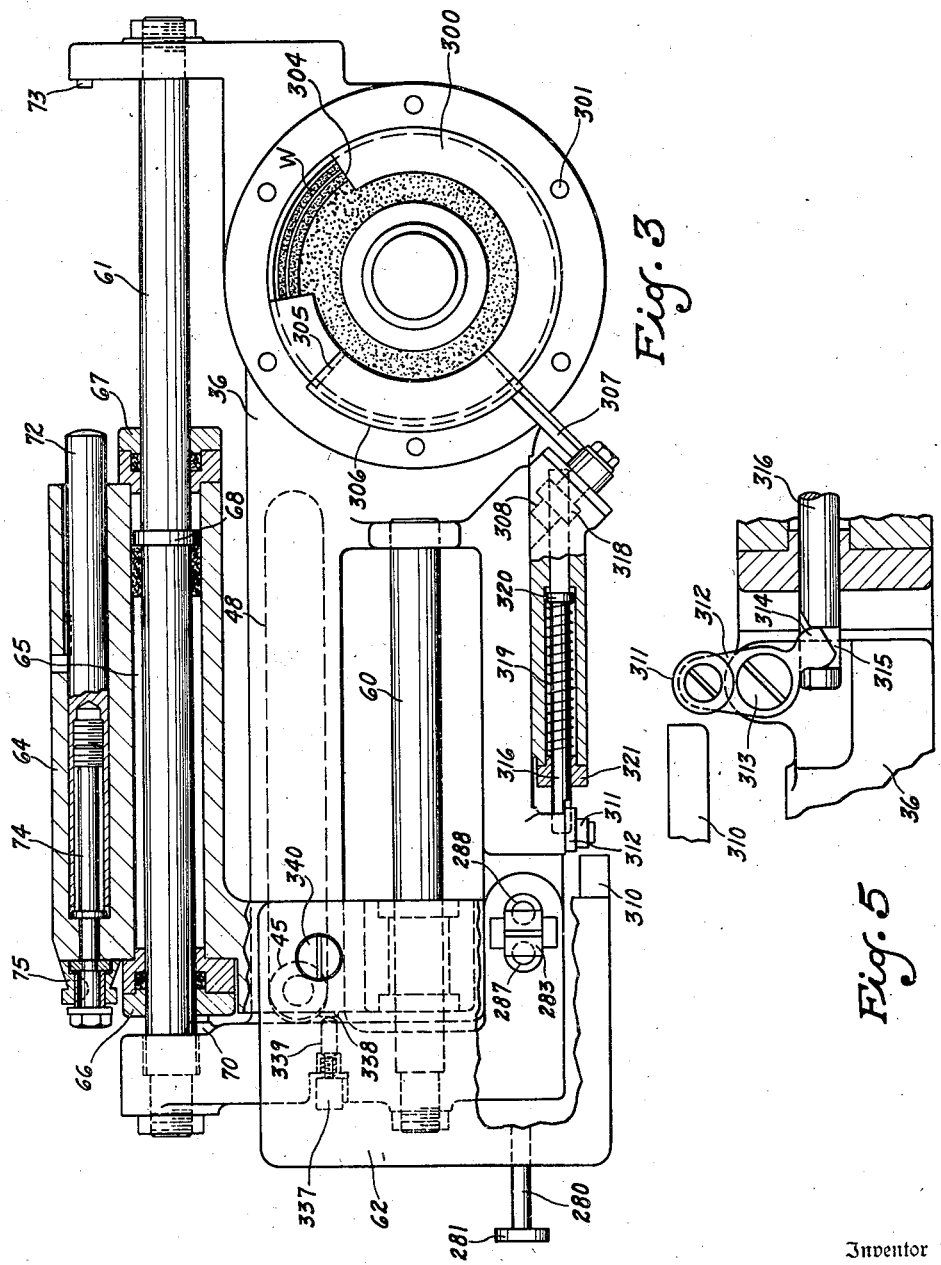

Inventor
LEONARD O. CARLSEN
By
Attorney

June 26, 1945.　　　　L. O. CARLSEN　　　　2,378,980
DRESSING MECHANISM
Filed March 1, 1943　　　8 Sheets-Sheet 6
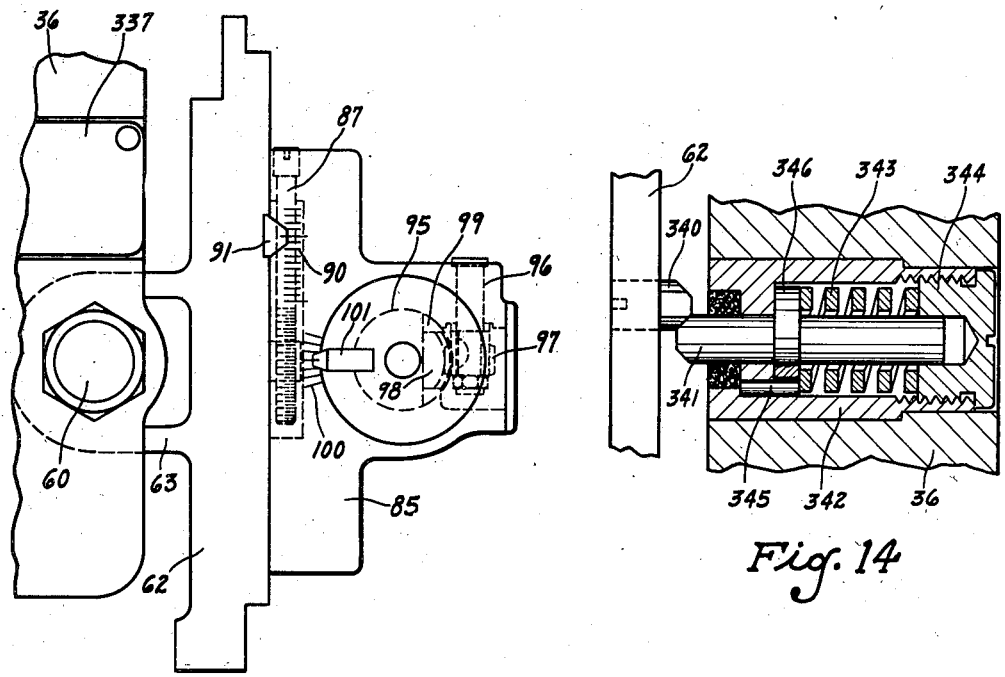
Fig. 13
Fig. 14
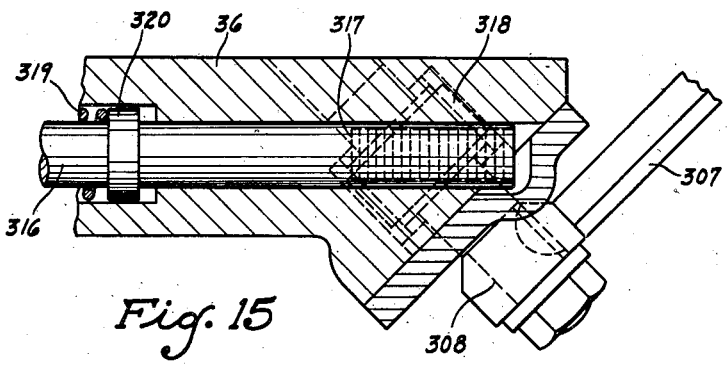
Fig. 15
Inventor
LEONARD O. CARLSEN
By
Attorney

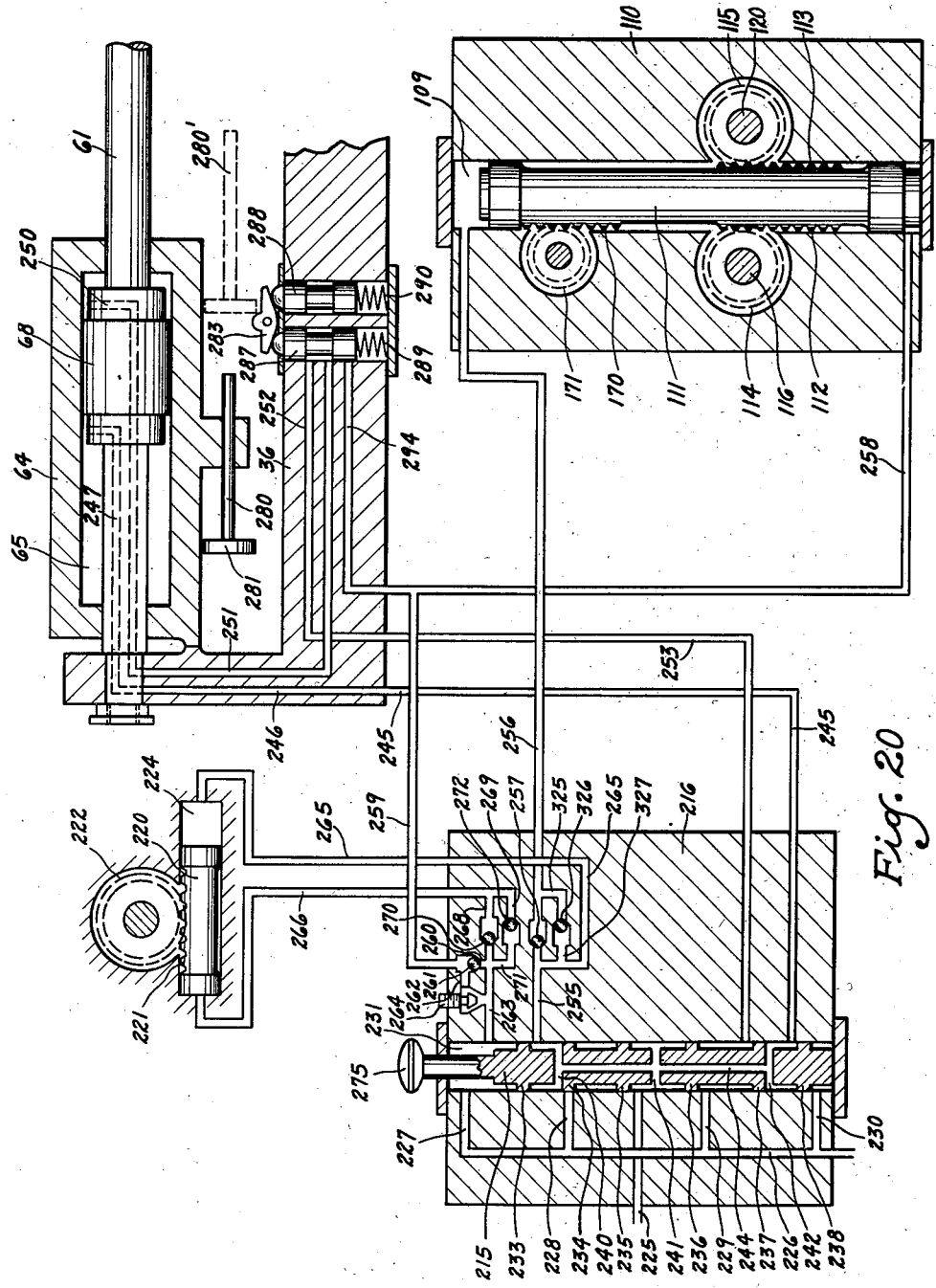

Patented June 26, 1945

2,378,980

UNITED STATES PATENT OFFICE 2,378,980

DRESSING MECHANISM

Leonard O. Carlsen, Rochester, N. Y., assignor to Gleason Works, Rochester, N. Y., a corporation of New York Application March 1, 1943, Serial No. 477,561

26 Claims. (Cl. 125—11)

The present invention relates to grinding machines and to dressing mechanisms for such machines. In particular, the invention relates to machines for grinding spiral bevel and hypoid gears in a generating operation, and to dressing mechanisms for machines of this type.

In spiral bevel and hypoid gear grinders of the generating type, a rotary annular grinding wheel is used. The wheel is mounted on an oscillatory cradle that is rotated in time with the rotation of the work to produce the generating motion and cause the wheel to grind correct tooth profiles on the work. To grind gears of different spiral angles, the wheel has to be adjusted on the cradle angularly about the cradle axis. In the spiral bevel and hypoid grinders of the generating type heretofore built, the dressing mechanism is mounted on the same part that supports the wheel so that it is adjustable with the wheel for spiral angle. This has made the guarding of the wheel very difficult and complicated the connection of the dressing mechanism with its source of power. For different spiral angle positions, moreover, the dressing mechanism has had to be adjusted to different positions around the wheel so as to avoid interference with the work, and even then, difficulty has been experienced on some jobs in obtaining sufficient clearance between the dressing mechanism and the work during grinding.

For grinding some forms of gears, particularly gears such as are used in aeroplane drives, it is necessary to grind the bottoms of the tooth spaces as well as the sides of the teeth. The purpose of this is to have the sides and bottoms of the tooth spaces join one another smoothly and avoid any tendency for cracks to develop at the junctures of the sides with the bottoms of the teeth when the gears are under load. The grinding wheels used accordingly must be dressed with rounds at the junctures of their sides and their tip so that they will grind well-rounded fillet curves in the bottoms of the tooth spaces of the gear. Where the wheel is to grind both sides of a tooth space simultaneously, it is customary to dress the top of the wheel to an elliptical shape, for a wheel so dressed will grind a fairly flat bottom in a tooth space with the desired well-rounded fillet curves at the junctures of the sides and bottoms of the tooth spaces. When one side of a tooth space is ground at a time, however, the elliptical shape is not satisfactory for then a ridge will be left in the bottom of each tooth space where the ellipse, which is formed by the wheel in grinding one side of a tooth space, joins the ellipse which is formed by the wheel in grinding the opposite side of the tooth space.

One object of the present invention is to provide a generating type of gear grinder on which the dressing mechanism is so mounted as readily to clear the work regardless of the position of the wheel in its adjustment for spiral angle.

Another object of the invention is to provide a generating type machine for grinding tapered gears, in which the weight of the dressing mechanism may be supported independently of the cradle, so that the cradle may be operated at high speed for generating the tooth profiles without the dressing mechanism in any way effecting its balance or tending to cause setting up of vibrations.

Another object of the invention is to provide a generating type of gear grinder which will permit of guarding the wheel very simply and completely in any adjusted position.

A further object of the invention is to provide a generating type of gear grinder in which the dressing mechanism is mounted so as to be moved away from the wheel after dressing so that it is entirely out of the way during grinding and can neither interfere with the work nor with the guarding of the wheel.

Another object of the invention is to provide a dressing mechanism which has side and tip dressers and in which the mechanism for actuating the dressers is simplified very much as compared with previous forms of such dressing mechanisms. To this end, it is a purpose of the invention to provide a dressing mechanism in which the side and tip dressers can be actuated simultaneously by movement of a single hydraulically operated piston.

Another object of the invention is to provide a generating type of gear grinder in which the dressing mechanism is so mounted as to reduce the length of the flexible hoses required for conducting the motive fluid to and from the actuating parts of the dressing mechanism, and bring these hoses together so that they can readily be guarded.

Still another object of the invention is to provide a dressing mechanism with which the wheel may be dressed to have a flat tip surface but with rounds joining the tip surface with the sides.

Another object of the invention is to provide a dressing mechanism which is movable to an inoperative position clear of the wheel, after dressing is completed, and in which the move-position may be employed to dress a flat tip surface on the wheel.

A further object of the invention is to provide a dressing mechanism in which the tip of the wheel may be dressed either with rounded or a flat surface.

Another object of the invention is to provide a gear grinder in which the wheel is fully guarded during grinding, but in which a part of the guard is opened automatically when the dressing mechanism is moved to operative position in order to permit the dressing tools to engage the wheel, and in which the guard is closed automatically when the dressing mechanism is moved to inoperative position.

Another object of the invention is to provide a gear grinding machine in which the dressing mechanism is moved from an inoperative position to an operative position prior to dressing and is adapted to be returned to inoperative position again after dressing, and in which a safety device is provided to insure that the dressing mechanism is in inoperative position before grinding can be restarted.

Still another object of the invention is to provide a dressing mechanism in which the side and tip dressers are moved at a fast rate for rough-dressing and at a relatively slow rate for finish-dressing, and in which the rate of movement of the dressers is controlled automatically by the dressing mechanism itself in its operation.

A further object of the invention is to provide a gear grinding machine in which the grinding wheel is advanced automatically between rough-dressing and finish-dressing so as to determine precisely the amount of stock that is taken off the wheel in the finish dressing operation.

A still further object of the invention is to provide a dressing mechanism which can be adjusted readily for dressing wheels of various diameters, heights, pressure angles, and profile shapes.

Other objects of the invention will be apparent hereinafter from the specification and from the recital of the appended claims.

In the drawings:

Fig. 2 is a fragmentary sectional view approximately on the line 2—2 of Fig. 1, showing the way in which the banjo-type bracket is mounted on the machine and showing part of the dresser slide;

Fig. 3 is an elevational view of the parts shown in Fig. 2 with the wheel guard in place, certain of the parts being broken away;

Fig. 4 is a fragmentary sectional view on an enlarged scale showing the valve which determines the speed of movement of the dresser slide and part of the trip mechanism for said valve;

Fig. 5 is a fragmentary view on an enlarged scale showing part of the mechanism for tripping the wheel guard shutter;

Fig. 8 is a section on the line 8—8 of Fig. 6;

Fig. 13 is a fragmentary end view of the block, which is adjustable for control of the profile shape to be dressed on the grinding wheel of the dresser slide, and of the banjo;

Fig. 14 is an enlarged view, showing the detent for releasably holding the dresser slide in inoperative position during grinding;

Fig. 15 is a fragmentary sectional view on an enlarged scale of part of the mechanism for operating the shutter on the wheel guard;

Figure 1:
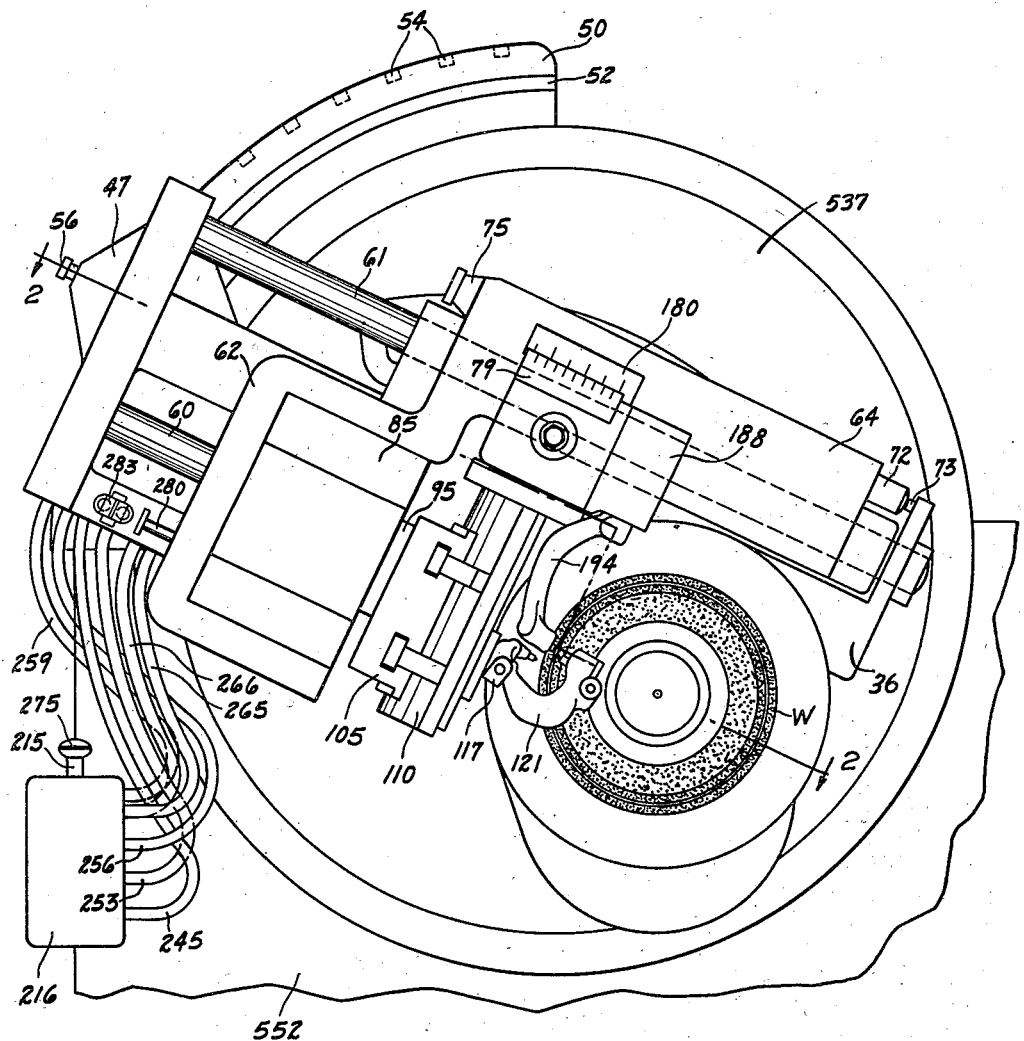
Fig. 1 is an elevational view looking at the wheel end of a spiral bevel and hypoid gear grinding machine, constructed according to the Wildhaber Patent No. 2,252,743 and provided with the dressing mechanism and other improvements of the present invention.

Figs. 16 to 19 inclusive are diagrammatic views showing successive positions of the dresser tools in the operation of dressing a grinding wheel with the dressing mechanism of the present invention; and Fig. 20 is a diagrammatic view of the hydraulic circuit employed for actuating the dressing mechanism, the dresser slide, and the mechanism for advancing the grinding wheel.

Only so much of the machine of the Wildhaber Patent No. 2,252,743 is shown as is necessary to an understanding of the present invention. The parts shown in the present drawings, which have been illustrated in the patent, are designated by the same numerals as are employed in the patent except that that are increased by 500. Thus, in the patent, the cradle of the machine is denoted at 37 and the wheel spindle at 22. In the present application, these same parts are denoted by 537 and 522, respectively.

The grinding wheel W, which is used on the machine, is secured to the wheel spindle 522 (Fig. 2). This spindle is journaled on suitable bearings, one of which is shown at 525, in a sleeve 527. The sleeve 527 is adapted to be moved axially to advance the grinding wheel to compensate for wear and for dressing, and to this end is mounted on angularly spaced sets of roller bearings, of which two sets are denoted at 531 and 532, respectively. The sleeve 527 constitutes the inner race for these bearings while the outer race is denoted at 28.

The roller bearings and their races are mounted in a carrier 528. The carrier 528 is pivotally mounted in the cradle 537 of the machine, and the cradle is oscillatably mounted on roller bearings 551 in the cradle housing 552.

The structure and mounting of the carrier and of the cradle is described in detail in the Wildhaber patent above mentioned. A plate 25, which is secured to the cradle by screws 26, and a plate 27, which is secured in any suitable manner to the plate 25, serve to close the openings provided in the front of the cradle for adjustment of the carrier 528 therein. A circular gib 29, which is secured to the cradle housing 552 by screws 30, serves to limit axial forward movement of the cradle in the housing. A circular guard 32, which seats in a recess in the carrier 528, serves to protect the bearings 532 and 531 against water and grit. A cylindrical collar 33 surrounds this guard, and journaled by means of roller bearings 34 on this collar is the cylindrical or banjo portion 35 of a dresser-carrying bracket 36.

The seal 37, which surrounds the guard 32 and which is secured to the banjo portion 35 of the bracket 36, by screws 38, serves to prevent entry of water or grit into the front end of the roller bearings 34. A seal member 39, which also surrounds banjo portion 35 of the bracket 36, serves to protect the bearings 34 at their rear from water and grit. The seal 39 is secured to the carrier 528 by screws (not shown) which also serve to secure the collar 33 to the carrier.

The banjo bracket 36 has an elongated arm at one side which is supported at its outer end by a roller 45 (Figs. 2 and 3) which is mounted on a stud 46 that is secured in a bracket 47. The roller 45 engages in an elongated slot 48 formed in the rear face of the bracket 36.

The bracket 47 is adjustably mounted on an arcuate plate 50 (Figs. 1 and 2) which is secured to the cradle housing 552 by screws 51. The plate 50 is formed with an arcuate T-slot 52 which is concentric with the axis of the cradle 537. The plate also has a series of equi-spaced notches or openings 54 formed on its periphery. There is a spring pressed plunger 55 mounted in the bracket 47 to be engaged selectively with the notches 54 in the plate 50. The plunger may be manipulated by the knob 56 and is normally held in locking position by the spring 57. A T-bolt 58, which engages in the slot 52, serves with the plunger 55 to secure the bracket 47 in any adjusted position on the plate 50. The roller 45 slides in the slot 48 so that the bracket 47 supports the bracket 36 in any adjusted position of the carrier 528. The bracket 47 is adjusted on the plate 50 to permit positioning the dressing mechanism so that the dressers will operate at a point substantially opposite the point of grinding, as will appear hereinafter.

There are two parallel cylindrical bars 60 and 61 (Figs. 1, 2 and 3) secured in the bracket 36. There is a slide 62 mounted to reciprocate on the bars 60 and 61. This slide is formed with a cylindrical bearing portion 63 (Fig. 13) which engages the bar 60 and with an elongated cylindrical portion 64 (Figs. 1 and 3) that is bored at 65 to receive the bar 61. The bore 65 has its two ends closed by stuffing boxes 66 and 67 of standard construction so that it forms a fluid-tight cylinder. The bar 61 has an enlarged portion 68 formed within the bore 65 and this portion constitutes a piston which reciprocates in this cylinder. A suitable pressure fluid may be supplied at either side of the piston 68 to move the slide 62 rectilinearly in either direction on the bracket 36.

In Fig. 3, the slide 62 is shown at the limit of its outward movement, that is, in its inoperative position, which is determined by the engagement of the cap portion of the stuffing box 66 with a pad or stop 70 formed on the bracket 36. The extent of inward movement of the slide is adjustable in accordance with the diameter of the grinding wheel W to be dressed. For this purpose, there is a cylindrical stop member 72 (Fig. 3) adjustably mounted in a bore formed in the bearing portion 64 of the slide 62 parallel to the bore 65. This stop member 72 is adapted to engage a pad or lug 73 formed on the bracket 36. The stop member 72 can be adjusted by rotating a shaft 74 which threads into the stop member 72 and which is journaled in the bearing portion 64 of slide 62. A graduated dial 75 is keyed to the shaft 74 to permit of making this adjustment precisely.

Figure 9:
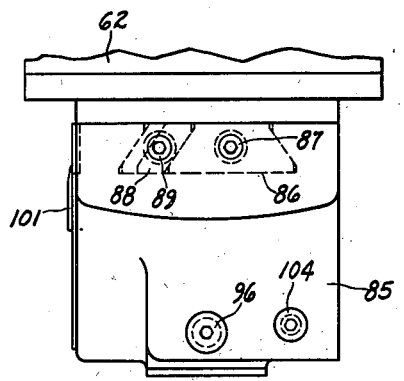
Fig. 9 is a plan view of certain of the parts shown in Fig. 6.

Mounted on the slide 62 for rectilinear adjustment thereon in a direction at right angles to the direction of movement of the slide is a block 85 (Figs. 1 and 13). The slide 62 is formed on its front face with a dove-tailed guide portion 86 (Figs. 9 and 6) which engages in a complementary slot formed in the rear face of the block 85. There is a screw shaft 87 journaled in the block 85 which threads into a nut carried by the dove-tailed guide portion 86 and which serves, on rotation, to adjust the block 85 on the slide 62. To clamp the block 85 in any adjusted position or to take up wear, there is a wedge shaped gib 88 interposed between one side of the dove-tailed guide 86 and one side wall of the guide-receiving slot of slide 62. This gib can be adjusted by a screw 89. To permit of adjusting the block 85 on the slide precisely, the block is provided with graduations, as indicated at 90 in Fig. 13, to read against an index pointer 91 which is secured to the slide.

Journaled in the block 85 (Figs. 6 and 13) is a cylindrical post 95. The post 95 is adjustable angularly in the block 85. This adjustment is effected by rotation of a worm shaft 96 which is rotatably mounted in the block 85 and to which is keyed a worm 97. The worm meshes with a wormwheel segment 98 which is secured to the post 95 within a slot 99 formed therein. Angular adjustment of the post 95 in the block 85 can be made precisely by use of the graduations 100 provided on the block 85 and the index pointer 101 which is secured to one end of the post 95. After the adjustment has been made, the post is secured in adjusted position by rotating the screw 104 (Figs. 6 and 8) to tighten the clamping blocks 102 and 103 on the periphery of post 95. The screw threads into the block 103 and is formed with a shoulder that engages the clamping block 102. The clamping blocks are of conventional form and have rounded clamping faces to conform to the periphery of the post 95.

There is a block 105 (Fig. 6) secured by screws 106 to one end of the post 95. Mounted on the block 105 for angular adjustment thereon about an axis which is at right angles to the axis of the post 95 is a cylinder block 110. The cylinder block 110 is provided with a bore in which the piston 111 reciprocates.

Figure 11:
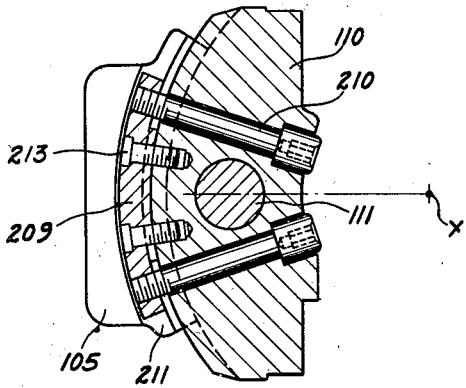
Fig. 11 is a view through this block taken substantially on the line 11—11 of Fig. 6 and illustrating the means for locking this block in any position of its angular adjustment.
Figure 12:
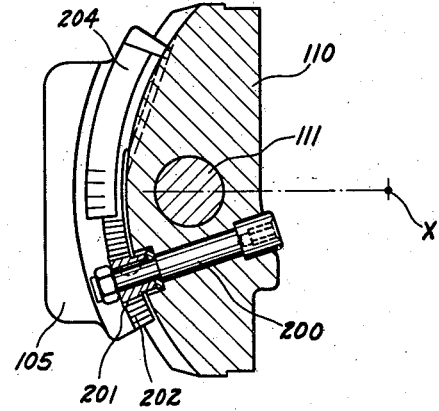
Fig. 12 is a section through this block on the line 12—12 of Fig. 6 and showing the means for adjusting this block angularly.

Angular adjustment of the cylinder block 110 on the block 105 is about the axis $x$ (Figs. 11 and 12). It may be effected by rotation of the shaft 200 which is journaled in the cylinder block 110 and to which is keyed a bevel pinion 201. This bevel pinion meshes with a bevel gear segment 202 which is fastened to the block 105. There is a scale 204 fastened to the block 105, and an index pointer 206 (Fig. 6) is secured to the cylinder block 110 to read against the scale to permit this angular adjustment to be precisely. For guiding the cylinder block in its adjustment, there is a tongue 207 (Fig. 6) formed on the cylinder block which engages in a T-slot 208 formed in the block 105. Tongue 207 and T-slot 205 are concentric with the axis $x$. After the adjustment is made, the cylinder block 110 can be secured to the block 105 in adjusted position by tightening up on the tongue or gib 209 (Fig. 11) through manipulation of the bolts 210. This tongue or gib 209 is formed concentric with the axis $x$ and fits into the T-slot 211 (Fig. 6) formed in the block 105 which is also concentric with the axis $x$. The gib 209 is secured to the cylinder block 110 by screws 213 and is relieved adjacent both ends so that when the bolts 210 are tightened up the tongue is flexed to bind in the T-slot 211.

Figure 10:
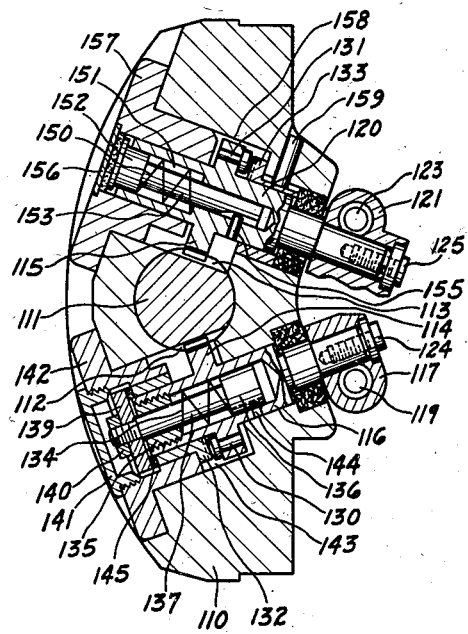
Fig. 10 is a sectional view through the side dresser block taken substantially on the line 10—10 of Fig. 6 and illustrating the operating mechanism for the side dresser arms.

Racks 112 and 113 (Figs. 6, 10 and 20) are cut into opposite sides of the piston 111. The rack 112 meshes with a gear segment 114 and the rack 113 meshes with a gear segment 115. The segment 114 is integral with a shaft 116 which is journaled in the block 110 and which has a reduced outer end on which is mounted arm 117 (Figs. 1 and 10) that carries the dressing tool 118 (Figs. 1 and 16 to 19) for dressing the outside surface O of the grinding wheel. The arm 117 has a split-clamp portion which fits over the reduced outer end of the shaft 116 and which is tightened on the shaft by a bolt 119. The arm 117 is held against axial movement relative to shaft 116 by the headed screw 124 which threads into the shaft.

The segment 115 is integral with a shaft 120 which is of reduced diameter at its outer end. The arm 121 (Figs. 1, 10 and 16 to 19), which carries the dresser 122 for dressing the inside surface I of the grinding wheel, is secured to this reduced portion of the shaft 120. The arm has a split-clamp portion which fits over the reduced outer end of the shaft 120 and which is tightened on the shaft by a bolt 123. The arm 121 is held against axial movement relative to shaft 120 by the headed screw 125 which threads into the shaft.

The shafts 116 and 120 are disposed substantially at right angles to the outside and inside surfaces O and I, respectively, of the grinding wheel W to be dressed. The arm 121 is shaped according to conventional practice so that at a mean point of swing of the arm, the diamond 122 will engage the inside surface of the wheel at a point lying in the same radial plane of the wheel as the point of engagement of the diamond 118 with the outside surface of the wheel when the arm 117 is at a mean point of its swing. The arms 117 and 121 are so shaped or bent, moreover, and the dressers 118 and 122 are so mounted therein that the diamonds will lie substantially at right angles to the side surfaces which each is to dress.

From the preceding description it is seen that as the piston 111 is reciprocated in one direction or the other, it will impart rotary motion to the shafts 116 and 120. This will cause the dressing tools 118 and 122 to be swung across the outside and inside faces, respectively, of the grinding wheel to dress these faces. The shafts 116 and 120 may also be moved axially simultaneously with their rotary motions. For this purpose, contact members 130 and 131 and cams 132 and 133 are provided. The contact member 130 is secured in an enlarged portion of the shaft 116 opposite the segment 114 and engages the front face of the control member 132. The contact member 131 is secured in an enlarged portion of the shaft 120 opposite the segment 115 and engages the rear face of the control member 133. The shaft 116 is journaled at its rear end in the control member 132 and the shaft 120 is journaled at its forward end in the control member 133. The contact member 130 is held in engagement with the front face of the control member 132 by a coil spring 134. This spring is interposed between a nut 135, that is threaded into the bore of the shaft, and the head 136 of a plunger 137. The tension of the spring is adjusted by a nut 139 which is threaded on the rear end of the plunger and is held in position by a lock nut 140. A friction disc 145 may be interposed between the nut 139 and the rear face of the sleeve portion of control member 132 to apply a friction load on shaft 116 to take up the backlash in the gear train driving said shaft. The cap 141 serves to protect the parts against grit and water. This cap threads into the sleeve member 142. This sleeve member is mounted in the bore 143 of the cylinder block 110 and serves as a bearing for the control member 132. The plunger 137 is held against rotation relative to the shaft 116 by pin 144 which engages in a slot that is formed in the head 136 of the plunger 137 and that extends axially of the shaft.

The contact member 131 is held in engagement with the rear face of the control member 133 by a coil spring 150. This spring engages at one end with the bottom of the hole 151, that is counterbored in the shaft 120, and at its other end with the enlarged head 152 on a plunger 153 which is mounted in this hole. The plunger 153 is held against rotation relative to the shaft 120 by a pin 155 which engages in a slot formed in the plunger 153 extending axially of the shaft. A plate 156 which is secured in any suitable manner to the bearing member 157 serves to hold the plunger 153 and spring 150 in assembled position. The plate 156 may be lined with friction material to engage the head 152 of plunger 153 and apply friction to shaft 120 to take up the backlash of the gear train driving said shaft. The bearing member 157 is secured in any suitable manner in the bore 158 of the cylinder block 110 in which the shaft 120 is mounted, and it serves as a bearing for the rear end of the shaft 120. The control member 133 is held against rotation by a pin 159 which is driven into a hole in the cylinder block 110.

Figure 6:
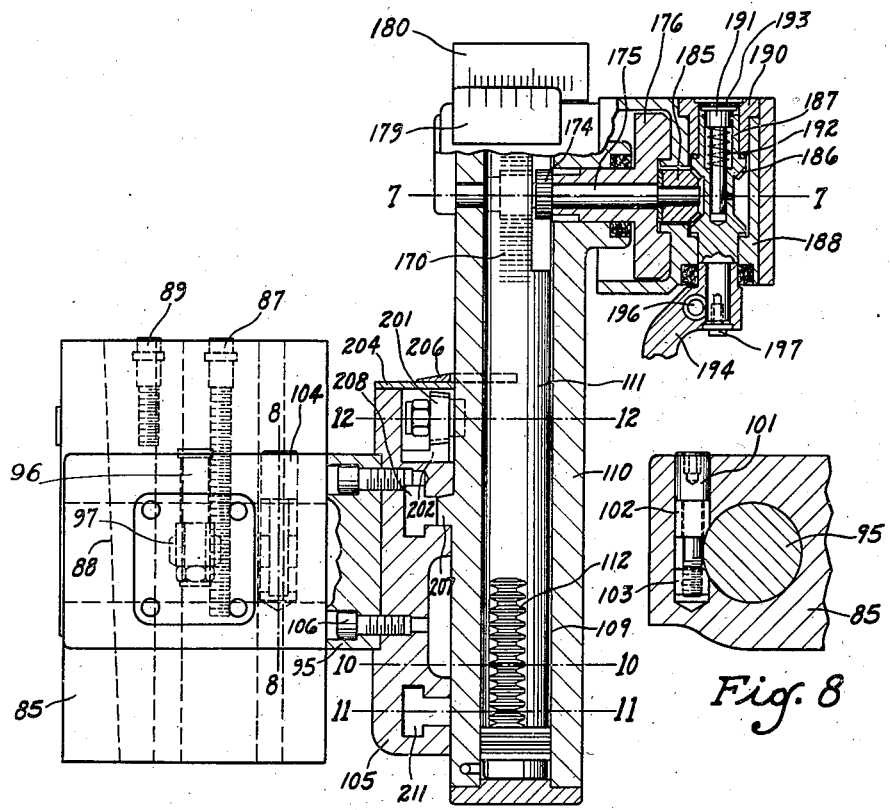
Fig. 6 is a fragmentary view, partly in section, showing the piston for actuating the dressers and the mounting of this piston.
Figure 7:
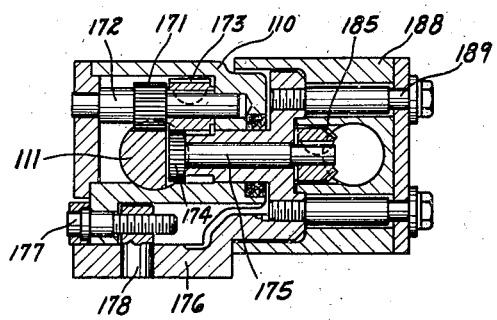
Fig. 7 is a sectional view on the line 7—7 of Fig. 6.

The piston 111 is provided at its upper end with a rack 170 (Figs. 6, 7 and 20). This rack meshes with a spur pinion 171 that is integral with a shaft 172 which is journaled in the cylinder block 110. There is a long-faced spur-gear 173 keyed to the shaft 172 and this spur gear meshes with a spur gear 174 which is integral with a shaft 175. The shaft 175 is journaled in a block 176 which is adjustable rectilinearly with reference to the cylinder block 110 in a direction at right angles to the longitudinal axis of the cylinder 111. This adjustment can be made by rotation of the screw shaft 177 which is journaled in the cylinder block 110 and which threads into a nut 178 that is secured in the block 176. The long face of gear 173 permits of mesh between gear 173 and gear 174 in any position of this adjustment. The adjustment can be made precisely by use of the graduated scale 179 which is fastened to the block 176 and the vernier 180 which is secured to the cylinder block 110.

Keyed to the shaft 175 at the end opposite that which carries the gear 174 is a bevel gear 185. This bevel gear meshes with a bevel gear 186 which is integral with a shaft 187. When the block 176 is in the zero position of its adjustment, the axis of the shaft 187 coincides with the axis $x$ (Figs. 11 and 12) about which the cylinder block 110 is adjustable. This axis is normal to the plane containing the axes of the shafts 116 and 120. The shaft 187 is journaled at its upper end in a bushing 190, which is secured in a block 188, and at its lower end is journaled directly in the block 188. The block 188 is secured to the block 176 by bolts 189. There is a plunger 191 mounted in a bore formed in shaft 187. A coil spring 192, which is interposed between the head of the plunger and a shoulder formed in the bore of shaft 187, serves to hold the head of the plunger against a friction plate 193 to put a friction load on the shaft 187 and take up backlash in the train driving the same. The plate 193 is secured in any suitable manner to bushing 190.

Mounted on the lower end of the sleeve 187 is an arm 194 (Figs. 1, 6, 16 to 19 inclusive) which carries the dresser 195 for dressing the rounds on the grinding wheel at the junctures of the sides and tip of the wheel. The arm 194 is formed with a split clamp at its upper end to engage over the reduced portion of the shaft 187 and is secured to the shaft by tightening up this clamp by manipulation of the bolt 196 (Fig. 6). A headed screw 197, which threads into the lower end of shaft 187, serves to retain the arm 194 in position on the shaft.

Figure 16:
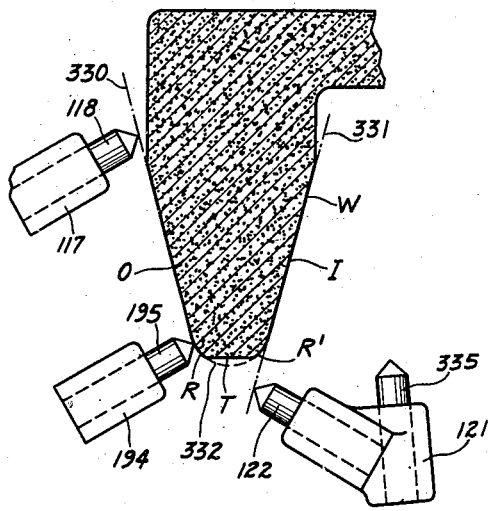
Figure 17:
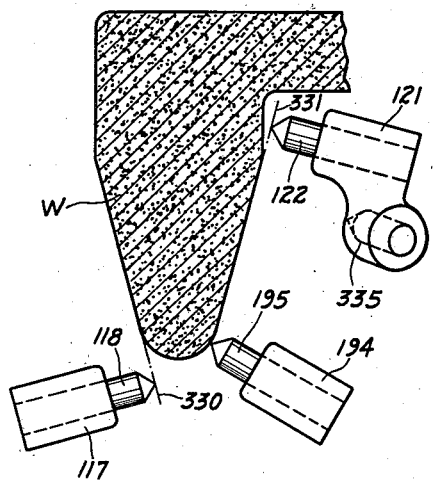
Figure 18:
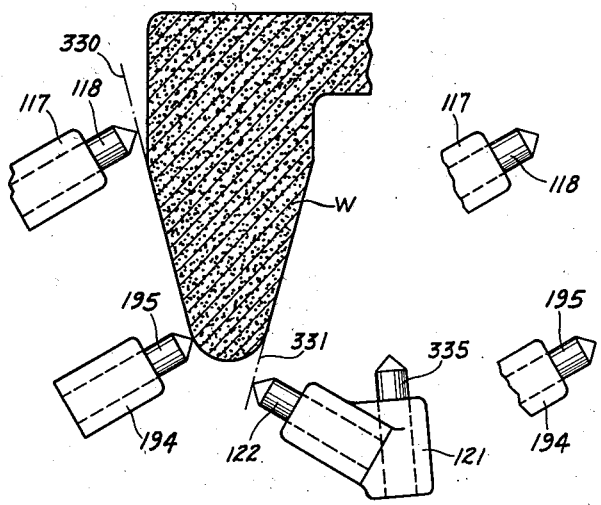

The arm 194 is of such length and is so shaped and the dresser 195 is so mounted therein that the point of the dresser 195 will travel in the radial plane of the wheel which contains the points of engagement of the dressers 118 and 122 with the wheel at mean points of swing of the arms 117 and 121. To avoid interference between the dressers, then, the dresser 118 must travel from the base to the tip of the wheel while the dresser 122 is traveling from the tip to the base of the wheel and the dresser 195 is traveling from the outside to the inside of the wheel, as shown in Figs. 16 to 18 and as will be described more fully hereinafter.

The movements of the cylinder 64, which carries the dressing mechanism to and from operative position, and of the piston 111 which actuates the dressers, are controlled by a manually operable valve 215 (Figs. 1 and 20). This valve is reciprocable in a valve block 216 that is secured to the cradle housing 552. This valve also controls the operation of a piston 220 (Fig. 20) which actuates the mechanism for advancing the grinding wheel axially between rough-dressing and finish-dressing to control the operative position of the wheel and the amount of stock taken off the wheel in the dressing operation.

In the machine of the Wildhaber Patent No. 2,252,743, above mentioned, the advance of the wheel is effected manually through rotation of the shafts 60, 63 and 68 shown in Figs. 3 and 4 of that patent. The last named shaft has a pinion 69 keyed to it which meshes with a pinion 70 that in turn meshes with a pinion 71 on a screw shaft 72 to move the grinding wheel axially. In a machine constructed according to the present invention, the manual means for rotating the screw shaft may be replaced by automatic means. Thus the piston 220 of Fig. 20 of the present application may replace the shafts 60, 63 and 68 of the Wildhaber patent. The piston 220 is provided with rack teeth 221 which mesh with the teeth of a gear 222 which may replace the pinion 69 of the Wildhaber patent. This pinion 222 may drive the pinion 70 of the Wildhaber Patent No. 2,252,743 through a pawl and ratchet wheel or other suitable form of one-way clutch so as to transmit motion to the pinion 70 on reciprocation of the piston 220 in one direction only.

The motive fluid is supplied to the valve 215 under pressure from the duct 225, and it is exhausted from the valve through the duct 226. This latter duct is connected to the valve through the four ducts 227, 228, 229, and 230. The valve has six spacing or guide collars formed on its periphery to closely engage the inside of the cylindrical bore 231 in which the valve slides. These spacing collars are denoted at 233, 234, 235, 236, and 238, respectively. The valve is turned to have peripheral grooves between these spacing collars in the usual manner. The valve has three parallel ducts 240, 241, and 242, respectively, cut diametrically through it. These ducts communicate with a central duct 244 that extends axially longitudinally of the valve.

In the position of the valve shown in Fig. 20, the pressure fluid flows through the duct 225 into the duct 241 and thence through the duct 244 into a duct 245 which communicates with a duct 246 that is drilled in the banjo bracket 36. This duct 246 in turn communicates with a duct 247 which is drilled in the bar 61. The last named duct opens into the cylinder 65 at one side of the piston 68. At this same time, the opposite side of the piston 68 is on exhaust through the duct 250 in the bar 61, the duct 251 in the bracket 36, the duct 252 in the bracket 36, the duct 253 which communicates therewith, and the ducts 229 and 226 in the valve block 216. Thus, the cylinder block 64 and dresser carrying slide 62 are held in withdrawn position with the dressing mechanism in inoperative position.

At this same time, the pressure fluid flows from the duct 225 through the ducts 241 and 244 of valve 215 into the duct 255 of the valve block 216. The duct 255 is connected with a duct 256 through a ball check valve 257, but the pressure of the fluid in the duct 255 forces this check valve open so that the fluid may flow into the duct 256. This duct communicates with the upper end of the cylinder 109 in which the piston 111 is mounted. Thus, at this time, the piston 111 is held down at the lowest position of its travel in the cylinder 109. The lower end of the cylinder is at this time on exhaust through the duct 258 and duct 259. The latter duct communicates with a duct 260 in the valve block 216, but the communication between the ducts 259 and 260 is closed by the pressure of the exhaust fluid on the ball check valve 261. The exhaust fluid flows, therefore, from the duct 259 into another duct 262 which also communicates with the duct 259. The duct 262 communicates with a duct 263 through an adjustable needle valve 264 which threads into the valve block 216. The duct 263 communicates, in the shown position of the valve 215 with the exhaust duct 227 which connects with the duct 226 leading to the sump of the machine. As will be obvious, adjustment of the needle valve 264 controls the rate of exhaust from the lower end of cylinder 109.

At this same time, also, the pressure fluid flows from the duct 255 into a duct 265 that connects with one end of the cylinder 224 in which the piston 220 is mounted. This holds the piston 220 at one end of its travel. The opposite end of the cylinder 224 is on exhaust through the duct 266 which communicates with two ducts 268 and 269 formed in the valve block 216. The duct 268 communicates with the duct 263, but in the shown position of valve 215 the connections between the two ducts is closed by pressure of the exhaust fluid on the ball check valve 270. The duct 269 communicates with a duct 271, and the ball check valve 272, which normally tends to close the connection between these two ducts, is at this time opened by the pressure of the exhaust fluid. The duct 271 communicates with the duct 263 which, in turn, communicates with the duct 227 that is connected to the duct 226 that leads to the sump.

To move the slide 62 with the dressing mechanism into operative position, when it is desired to dress the grinding wheel W, the operator moves the valve 215 outwardly by pulling the knob 275 outwardly far enough for the spacing shoulders 237 and 238 to be just above the ducts 253 and 245, respectively, and for the spacing shoulders 233 and 234 to be just below the ducts 263 and 255, respectively. This will bring the spacing shoulder 235 about midway between the ducts 225 and 228 and the spacing shoulder 236 about midway between the ducts 225 and 229. This causes the direction of flow of the motive fluid to be reversed between the opposite sides of the piston 68 without altering the direction of flow of the motive fluid either to the piston 111 or to the piston 220. The line 253 is put on supply and the line 245 on exhaust, but the lines 256 and 265 remain on supply and the lines 258 and 266 on exhaust. The supply to the line 253 is from the main pressure line 225 through the ducts 241 and 244 in the valve 215, while the exhaust from the line 245 is through the duct 230 into the duct 226 that leads back to the sump. With the line 253 on pressure, the motive fluid flows through the ducts 253, 251, and 250 to the right hand side of the piston 68. Thus, the cylinder block 64 and slide 62 are moved to the right, causing the dressing mechanism to be moved into operative position.

There is a rod 280 (Figs. 2, 3, 4 and 20) mounted in the slide 62. This rod has an enlarged head 281 which is adapted to engage with the central prong 282 of a three-pronged wheel 283 as the slide 62 moves back and forth in its reciprocation. The wheel 283 is pivotally mounted at 284 on a plate 285 which is fastened to the banjo bracket 36. There are two plungers 287 and 288 mounted in the bracket 36. These plungers are normally forced forwardly by springs 289 and 290, but are pushed rearwardly against the resistance of the springs on rotation of the wheel 283 in opposite directions. The plunger 288 acts simply as a balancing medium, but the plunger 287 acts as a valve to control the connection between the duct 251 and the ducts 252 and 294. The last named duct communicates with the ducts 258 and 259.

When the slide 62 moves from withdrawn position shown in Fig. 3 to operative position shown in Fig. 2, the head 281 of the rod 280 moves from the full line position shown in Fig. 20 to the dotted line position shown in that figure. In this movement, the head 281 of the rod engages the prong 282 of wheel 283, rocking the wheel about its axis and causing the prong 292 to depress the plunger 288 against the resistance of the spring 290. Nothing happens, however, because the plunger 288 is simply a balancing plunger.

In this same movement of the slide 62 to operative position, though, the shutter in the guard for the grinding wheel is tripped open so that when the dressing mechanism arrives in operative position it will have access to the wheel. The wheel is enclosed by a guard 300 (Fig. 3) which is secured to the plate 37 (Fig. 2) by screws 301. The guard has an opening in it at 304 to permit the grinding wheel to engage in the tooth space of the gear being ground. The guard also has an opening in it at 305 which is closed by the shutter 306 when grinding is taking place. The shutter 306 is mounted on an arm 307 (Figs. 3 and 15). Arm 307 is keyed to a shaft 308 which is journaled in the banjo bracket 36.

The arm is rocked by movement of the slide 62. For this purpose, there is a lug 310 (Figs. 3 and 5) secured to the slide 62. This lug is adapted to engage a roller 311 which is carried on a lever 312 that is pivotally mounted by means of the stud 313 on the bracket 36. The end 314 of the lever engages in a slot 315 which is formed in a rod 316. This rod is slidably mounted in the bracket 36 and is provided at its forward end with rack teeth 317 (Fig. 15) that mesh with the teeth of a spiral pinion 318 which is keyed to the rocker shaft 308.

The rod 316 is normally held in its rightward position by a coil spring 319. This spring surrounds the rod and is interposed between the collar 320 formed on the rod and the cap 321 which closes the opening in the bore of the bracket 36 in which the rod is mounted. As the slide 62 moves inwardly to operative position, the lug 310 engages the roller 311, causing the lever 312 to move the rod 316 to the left against resistance of the spring 319 with the result that the rack 317 rocks the pinion 318 and the shaft 308 to open the shutter 306 in guard 303, and allow access of the dressing mechanism to the wheel W.

The slide 62 moves to the right until the adjustable stop 72 (Figs. 1 and 3) contacts the lug or pad 73. The shutter 306 is then opened and the dressing mechanism is then in dressing position ready for dressing. The operator then moves the valve 215 (Fig. 20) further outwardly until the spacing shoulders 233 and 234 are above the ducts 263 and 255, respectively, and the spacing shoulders 235, 236, 237 and 238 lie just below the ducts 228, 225, 229 and 253, respectively. This causes the duct 263 to be put on supply and the duct 255 to be put on exhaust, while maintaining the ducts 253 and 245 on supply and exhaust, respectively. Thus the dressing mechanism is maintained in operative position while the piston 111 is moved upwardly in its cylinder 109.

The supply to the line 263, at this stage, is from the main pressure duct 225 through the ducts 241, 244 and 234 of the valve 215, while the exhaust from the line 255 is through the ducts 228 and 226. With the duct 263 on supply, the ball check valves 261 and 270 are forced open and the pressure fluid flows into the ducts 259 and 266. From the duct 259, the fluid flows through the duct 258 to the lower end of the cylinder 109, while from the duct 266 the pressure fluid flows into the left hand end of cylinder 224, forcing the piston 220 to the right to advance the grinding wheel axially. The upper end of the cylinder 109 is on exhaust at this time through the duct 256, the duct 325, the now-open ball check valve 326, and the ducts 327, 265, 255, 228, 226, while the right hand end of cylinder 224 is simultaneously on exhaust through the ducts 265, 255, 228 and 226.

As the piston 111 moves upwardly in the cylinder block 109, the shafts 116, 120 and 172 (Figs. 7, 10, and 20) are rotated to swing the side and round dressers 118, 122 and 195 in one direction, respectively, across the outside, the inside and tip surfaces, respectively, of the grinding wheel. In the swinging movement, the outside dressing tool 118 moves outwardly from the position shown in Fig. 16 to that shown in Fig. 17, its tip swinging in the plane 330 tangent to the outside surface O of the wheel. In this swinging movement, the inside dressing tool 122 moves inwardly from the position shown in Fig. 16 to the position shown in Fig. 17, its tip traveling in the plane 331 tangent to the inside surface of the wheel. In this swinging movement, the dressing tool 195 for the rounds moves across the tip of the wheel from outside to inside from the position shown in Fig. 16 to that shown in Fig. 17, its point tracing the arc 332 around the tip surface of the wheel. Since the line 256 is open full to exhaust through the now open check valve 326 (Fig. 20), the described movement of the dressing tools is at a relatively rapid rate and they rough-dress the wheel.

The movement of the piston 220 to the right causes, as already stated, the grinding wheel to be advanced axially. This advancing movement brings the wheel into correct grinding position and permits of dressing the required amount off the wheel. It will be noted from Fig. 17 that the wheel has been advanced axially from the position shown in Fig. 16 so that the dresser 195 dresses a round tip surface on the wheel, removing the original flat at the tip.

The operator now reverses the movement of the control valve 215, moving the valve back to its intermediate position where the spacing shoulders 233 and 234 lie just below the ducts 263 and 255, respectively, and the spacing shoulders 237 and 238 lie just above the ducts 253 and 245, respectively, and the spacing shoulder 235 is midway between the ducts 228 and 225 while the spacing shoulder 236 is midway between the ducts 225 and 229. This leaves the line 253 on pressure and the line 245 on exhaust, causing the dressing mechanism to be held in operative position. It, however, reverses the direction of flow of the motive fluid to the cylinder 109, putting the line 256 on supply from the main pressure line 225 through the ducts 241, 244 and 234, the duct 255 and the now open ball check valve 257. This causes the piston 111 to be moved downwardly in the cylinder 109 back to the position shown in Figs. 6 and 20.

This downward movement of piston 111 causes the dresser arms 117, 121 and 194 to be swung in the reverse direction from their previous movement. Hence the dresser 118 swings back in the plane 330 from the position shown in Fig. 17 to that shown in Fig. 18. Likewise, the dresser 122 swings back in the plane 331 and the dresser 195 swings back from the inside to the outside of the wheel to assume the positions shown in Fig. 18. The positions shown in Fig. 18 are the same as those shown in Fig. 16. In other words, the dressers return in the downward movement of piston 111 to initial positions.

During this downward movement of piston 111, the motive fluid exhausts from the lower end of the cylinder 109 through the lines 258 and 259, but the ball check valve 261 is closed by the pressure of the exhausting fluid so that the fluid can only flow back to the sump through the needle valve 264 and the lines 263, 227 and 226. Hence, the flow of the exhaust fluid is throttled so that the piston 111 moves downwardly at a reduced rate of speed as compared with its upward movement. The result is that on the reverse swing of the diamonds from the positions shown in Fig. 17 to those shown in Fig. 18, the dressing tools travel at a relatively slow rate across the surfaces being dressed and effect finish-dressing operations.

When the several dressing tools have reached the position shown in Fig. 18, the slide 62 can be withdrawn without any of the dressers striking the wheel. The operator now depresses the valve 215 further to return it to its lowermost position shown in Fig. 20. This leaves the line 256 still on supply and the line 258 still on exhaust, as shown, but it puts the line 245 on supply and the line 253 on exhaust, supply to the line 245 being from the main pressure line 225 through the ducts 241, 244 and 242, and exhaust from the line 253 being through the ducts 229 and 226 back to the sump.

This causes the slide 62 to be moved to the left from the position shown in Figs. 1 and 2 to the position shown in Figs. 3 and 20, thus withdrawing the dressing mechanism from operative position. As the slide 62 moves to the left, the head 281 of the rod 280 (Figs. 2 and 4) engages the spoke 282 of wheel 283, causing the plunger 287 to be momentarily depressed against the resistance of the spring 289. This shuts off momentarily the flow of the exhaust fluid from the line 251 through the line 252 and causes this exhaust fluid to flow momentarily instead from the line 251 into the line 294, whence it flows into the line 259. The pressure of the exhaust fluid then momentarily closes the ball check valve 261 so that the fluid must travel through the needle valve 264 to the lines 263, 227 and 226 to the sump. Thus, momentarily, the withdrawal movement of the slide 62 is slowed down. It is at this moment that the dressing tool 335 (Fig. 19), which is mounted in the same arm 121 that carries the inside dresser 122, passes across the tip of the wheel in the withdrawal movement of slide 62. Thus the dresser 335 is caused to dress a straight profile on the tip of the wheel by the movement of slide 62. The tip surface dressed on the wheel by this movement is finish-dressed because of the retardation of the slide movement during the dressing.

The dresser 335 passes, of course, across the tip of the wheel in the movement of the slide to operative position as well as in the described movement to inoperative position, but since the wheel is not advanced until after the dressing mechanism is in operative position, the dresser 335 does little or no dressing in the movement of the slide to operative position.

Figure 19:
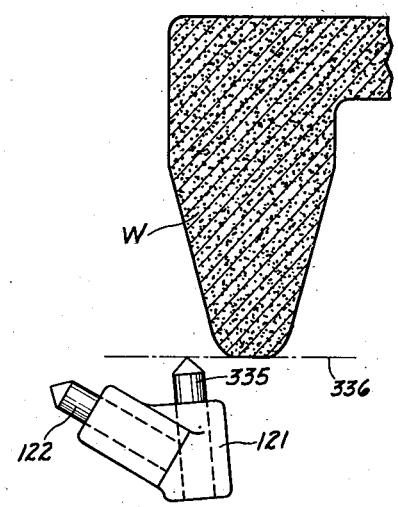

The dressing tool 335 is shown in Fig. 19 at a point in its travel just after it has completed its dressing movement. The other dressing tools 118, 195 and 122 are shown in this figure well to the left of the tool 335, as they would be at this stage of the withdrawal movement of the slide 62.

As soon as the head 281 of the rod 280 (Figs. 2, 4 and 20) has cleared the spoke 282 of wheel 283, the valve 287 pops back into the position shown under actuation of the spring 289. Thus, the line 294 is again shut off while the line 252 is again connected to the line 251 to conduct the exhaust fluid from the right hand end of the piston 68. Hence, the slide 62 resumes its rapid movement to inoperative position.

During this withdrawal movement, the lug 310 (Figs. 3 and 5) moves away from the roller 311 and the spring 319 serves to return the rod 316 to its leftward position causing the shutter 306 of the wheel guard 300 to be closed again. During the return movement of the slide, the piston 220 is also returned to the position shown in Fig. 20, resetting the mechanism for advancing the grinding wheel.

There is a standard limit switch 337 (Figs. 3 and 13) secured in a recess in the bracket 36. This limit switch is incorporated in the starting circuit of the motor (not shown) which operates the machine during grinding. It is a normally open switch and must be closed to maintain the circuit to said motor. The switch is closed when the slide 62 is returned to inoperative position, by engagement of the contact lug 338, which is formed on the slide 62, with the plunger 339. This plunger slides in a hole provided in the bracket 36 and engages the arm of the limit switch. It will be seen, then, that when the dressing mechanism is moved to operative position, the contact lug 338 will be carried away from plunger 339 to allow the limit switch 337 to open, stopping the main drive motor of the machine; and that this motor cannot be restarted until the slide 62 is back in inoperative position again. Thus the limit switch 337 acts as a safety device insuring that the dressing mechanism is out of the way before the grinding operation can be started.

As shown in Fig. 1, the slide 62, when it is in withdrawn position, is inclined to the horizontal and therefore would tend under action of gravity to slide down to operative position. To prevent this, a stop is provided to hold the slide frictionally in inoperative position. This stop is shown in Figs. 3 and 14. The stop includes a pin 340 which screws into the slide 62 and projects from the back thereof. The rearwardly projecting end of this pin is of substantially V-shape. It is adapted to engage the substantially V-shaped forwardly projecting end of a plunger 341 which is mounted within a sleeve member 342 that is secured in the bracket 36. The plunger 341 is normally pressed forwardly by a coil spring 343 which is interposed between an enlarged flange 346 formed on the plunger and a nut 344 that threads into the sleeve 342. A pin 345 which is secured in the sleeve 342 and engages in a hole in the flange 346 serves to hold the plunger against rotation. The pressure of the spring 343 is normally enough to hold the slide 62 in inoperative position; but when there is hydraulic pressure on the piston 68 to move the slide to operative position, the plunger 341 will be depressed against the action of the spring. Likewise, on return movement of the slide, the plunger 341 will again be depressed to allow the slide 62 to return to inoperative position.

The operation of the dressing mechanism of the present invention will be understood from the preceding description but may, briefly, be summed up here. The various parts of the mechanism are, of course, first adjusted in accordance with the spiral angle setting, diameter, pressure angle of the wheel, and in accordance with the profile shape which it is desired to dress on the wheel. The stop 72 (Fig. 3) is adjusted in accordance with wheel diameter. It limits the inward movement of the dressing mechanism to operative position. The block 85 (Figs. 13 and 9) is adjusted on the slide 62 in accordance with the character of the profile which it is desired to dress on the wheel. If it is desired to dress an approximately straight profile on the wheel, the block 85 is so adjusted that the side dressers 118 and 122 will swing about axes which are perpendicular to planes tangent to the sides of the wheel at the points of contact of the dressers with the wheel. A concave or a convex profile may be dressed on the wheel by adjusting the block 85 so that the dresser axes are above or below this mean position, respectively. By adjustment of the post 95 in the block 85, the position of swing of the axes of the side dresser arms can be further changed so as further to control the profile curvature dressed on the wheel. All this is in accordance with the principles of the Wildhaber and Carlsen Patent No. 2,311,302.

Adjustment of the cylinder block 110 on the block 105 (Fig. 6) permits of positioning the dressing tools in accordance with the pressure angles of the inside and outside surfaces which it is desired to dress on the wheel. Adjustment of the block 176 (Figs. 6 and 7) on the cylinder block 110 permits of setting the axis of swing of the round dressing tool 195 in accordance with the location desired for the rounds. The axis of swing of the round dressing tool may be symmetrical of the sides of the wheel or unsymmetrical thereof in accordance with the shape which it is desired to dress. Adjustment of the banjo bracket 36 angularly on the plate 50 (Fig. 2) permits of avoiding any possibility of interference of the dressing mechanism with the work regardless of the position which the wheel occupies about the axis of the cradle because of the spiral angle adjustment of carrier 528. This is done by releasing the T-bolt 58 and keeper 55 (Fig. 2) and moving the banjo 36 to the desired position, then allowing the keeper to engage again with one of the notches 54 in the arm 50 and tightening up the T-bolt 58. The throttle valve 264 (Fig. 20) is also adjusted in accordance with the desired speed of movement of the dressing tools in finish-dressing, that is, in accordance with the finish which it is desired to dress on the wheel. For dressing the sides of the wheels to profile shapes of varying inclination to the wheel axis, control members 132 and 133 (Fig. 10) will be used which will produce the required axial movements of the side dressers during swing of the dresser arms 117 and 121. If no axial movement of the dresser arms is desired during dressing, then flat-surfaced discs will be used for the control members, that is, discs having contact surfaces normal to the axes of shapes 113 and 116.

When all of the adjustments have been made, the dressing mechanism is ready for operation. When the operator desires to dress the wheel, then, he moves the valve 215 outwardly to its first position, putting the lines 253, 251 and 250 (Fig. 20) on supply and the lines 247 and 245 on exhaust, causing the cylinder block 64 with the slide 62 to be moved to the right to carry the dressing mechanism to operative position. At the very beginning of this movement, the contact member 338 moves away from plunger 339, allowing the limit switch 337 to open, stopping the main drive motor of the machine. In this movement, also, as previously described, the head 281 of the pin 280 will ratchet idly over the wheel 283 (Fig. 2) and the shutter 306 in the dresser guard (Fig. 3) will be opened by engagement of the lug 310 with roller 311 (Figs. 3 and 5). Then the operator moves the valve 215 to its uppermost position which puts the line 258 and 266 to the cylinders 109 and 224, respectively, on supply and the lines 256 and 265 from these cylinders, respectively, on exhaust while keeping the lines 253, 251 and 250 on supply and the lines 247, 246 and 245 on exhaust. Thus, while the dressing mechanism is held in operative position, the wheel is advanced axially and the piston 111 is moved upwardly in its cylinder 109 to rotate the arms 117, 121 and 194 (Figs. 1 and 16) to cause the outside, inside and round dressing tools 118, 122, and 195 to dress the wheel. In this dressing operation, the dressers are swung from the positions shown in Fig. 16 to the positions shown in Fig. 17. Since the line 256 is at this time freely open to exhaust through the duct 325, the open check valve 326, and the ducts 327, 255, 228 and 226, the dressing operation takes place at relatively high speed, rough-dressing the wheel. Then the operator moves the valve 215 downwardly again to its intermediate position, putting the line 256 of cylinder 109 on supply and the line 258 on exhaust while keeping the lines 253, 251 and 250 of cylinder 65 on supply and the lines 247, 246 and 245 on exhaust. Thus, while the dressing mechanism is retained in dressing position, the piston 111 is moved downwardly in its cylinder to swing the outside, inside and round dressing tools 118, 122, and 195, respectively, from the positions shown in Fig. 17 to the positions shown in Fig. 18 which is the identical position with those shown in Fig. 16. Since, during this downward movement of the piston 111, the exhaust from the lower end of the cylinder 109 through the lines 258 and 259 is throttled by the needle valve 264 the rate of travel of the dressing tools from the positions shown in Fig. 17 to those shown in Fig. 18 will be relatively slow and the wheel will be finish-dressed. The operator then pushes the valve 215 further down to its lowermost position. This keeps the line 256 on supply and the line 258 on exhaust, holding the piston 111 at the lowermost position of its travel in its cylinder, but it puts the lines 245, 246, and 247 on supply and the lines 250, 251, and 253 on exhaust, causing the slide 62 to be moved to the left toward inoperative position. At the very beginning of this movement, the head 281 of the rod 280 rides over the prong 282 of the wheel 283, depressing momentarily the valve 287 (Figs. 3, 4 and 20). This causes the fluid from the right hand end of the piston 68 to flow momentarily from the line 251 through the lines 294 and 259 and throttle valve 264 to the sump, so that momentarily the withdrawal movement of the slide 62 is slowed up. It is at this time that the dressing tool 335 (Fig. 19) carried by the inside dressing arm 121 passes across the tip T of the grinding wheel, dressing the wheel along the line 336. As soon as the dressing tool 335 has cleared the wheel, the head 281 of the pin 280 will clear the prong 282 of the wheel 283 and the valve 287 will be released to spring back to its normal position under actuation of the spring 289, connecting the line 251 again with the line 252 for normal exhaust from the right hand end of the cylinder 64. Thus the slide 62 with the dressing mechanism is moved on at high speed to full withdrawn position. During this withdrawal movement, the lug 310 (Figs. 3 and 5) will clear the roller 311, allowing the shutter 306 of guard 300 to be closed under operation of spring 319. At this same time, the pressure fluid in the line 265 will move the piston 220 back to the position shown in Fig. 20, resetting the wheel advancing mechanism. The operation of dressing will then have been completed. When the slide 62 reaches fully withdrawn position, the lug 338 (Fig. 3) engages plunger 339 to close limit switch 337 and the grinding operation of the machine may be restarted.

With the dressing mechanism of the present invention, it is possible to arrange the tubing, which connects the control valve 215 with the various fluid-pressure operated parts of the dressing mechanism, at one side of the machine as shown in Fig. 1 so that it can readily be guarded. This was not possible with previous designs of dressing mechanisms for bevel and hypoid gear grinders where the dressing mechanism moved with the wheel in the spiral angle adjustment of the wheel because there the tubing had to extend across the face of the cradle. Moreover, with the present invention, the lengths of the tubing are shortened. With the new construction, the tubing only has to be long enough to reach bracket 36 when it is in its highest adjusted position on plate 50. With the prior design, the tubing had to be long enough to reach the dressing mechanism in any position of spiral angle adjustment of the wheel with the result that when the wheel and dressing mechanism were in an adjusted position close to the control valve, the tubing hung in long loops and folds which were hard to guard and detracted from the appearance of the machine. With the new construction, moreover, the weight of the dressing mechanism is carried by the cradle housing through the bracket 47 and roller 45. The result is that the cradle can be oscillated at high speed and no unbalanced condition results from the mounting of the dressing mechanism on the machine. In this respect, the machine of the present invention is a distinct improvement over prior designs.

While the invention has been described in connection with a dressing mechanism for dressing an annular wheel and in connection with its use on a particular type of grinding machine, it will be understood that the dressing mechanism of this invention may be employed in dressing other types of wheels and on other types of machines. It will be further understood that while the invention has been described in connection with a particular embodiment thereof, it is capable of various further modifications. The present application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In a machine for grinding gears in a generating operation, the combination with a cradle, a housing in which the cradle is oscillatably mounted, a carrier mounted on the cradle for angular adjustment about an axis offset from the axis of the cradle, and a grinding wheel journaled rotatably on said carrier with its axis offset from the axis of the carrier, of a bracket which is secured at one end to said carrier and at its opposite end to said housing, and mechanism for dressing the grinding wheel mounted on said bracket.

2. In a machine for grinding gears in a generating operation, the combination with a cradle, a housing in which the cradle is oscillatably mounted, a carrier mounted on the cradle for angular adjustment about an axis offset from the axis of the cradle, a spindle journaled in said carrier with its axis offset from the axis of the carrier, and a grinding wheel secured to that spindle, of a bracket which is secured at one end to said carrier and at its opposite end to said housing, and a dressing mechanism slidably mounted on said bracket for movement to and from operative relation with the grinding wheel.

3. In a machine for grinding gears, the combination with a housing, a support adjustable angularly in the housing, a rotary spindle, a grinding wheel secured thereto, and a carrier in which the spindle is journaled, said carrier being mounted adjustably on the support to adjust the radial position of the axis of the spindle from the axis about which the support is adjustable, of a bracket journaled at one end coaxially of the spindle, means for supporting the bracket at its opposite end from the housing, said means being adjustable radially of the axis about which the support is adjustable, and mechanism for dressing the grinding wheel mounted on said bracket.

4. In a machine for grinding gears, the combination with a housing, a support adjustable angularly in the housing, a carrier, a spindle journaled in said carrier, and a grinding wheel secured thereto, said carrier being adjustably mounted on the support to vary the radial distance of the axis of the spindle from the axis about which the support is adjustable, of a bracket which is journaled at one end coaxially of the spindle, means adjustably secured to the housing for adjustably supporting the opposite end of the bracket, said means being adjustable angularly on the housing about the axis about which the support is adjustable and being adjustable with reference to the bracket radially of the last named axis, fluid pressure operated mechanism mounted on said bracket for dressing said grinding wheel, and means connected to the last named means and mounted on said housing for controlling the operation of said dressing means.

5. In a machine for grinding gears in a generating operation, the combination with a cradle, a housing on which the cradle is oscillatably mounted, a carrier mounted on the cradle for angular adjustment about an axis offset from the axis of the cradle, a spindle journaled in said carrier with its axis offset from the axis of the carrier, and a grinding wheel secured to said spindle, of a bracket which is secured at one end to said carrier and at its opposite end to said housing, and dressing mechanism mounted on said bracket for dressing said grinding wheel, fluid pressure operated means for actuating said dressing mechanism, a valve mounted on said housing for controlling the operation of the dressing mechanism, ducts for conducting the motive fluid from said valve to said brackets, and ducts in said bracket for communicating with the first named ducts for conducting the motive fluid to the dressing mechanism.

6. In a grinding machine, a support, a spindle journaled in the support, a grinding wheel secured to the spindle, a carriage mounted on the support, dressing mechanism mounted on the carriage and comprising a pair of dressing tools, one of which is movably mounted on the carriage and the other of which is fixed relative thereto, means for moving the carriage on the support to cause the second tool to dress the wheel and to move the first tool to and from operative relation with the wheel, and means for moving the first tool when the carriage is in operative position to cause said tool to dress the wheel.

7. Mechanism for dressing a rotary grinding wheel comprising a support, a pair of shafts journaled in said support with their axes in a common plane but inclined to one another, an arm secured to each of said shafts, dressing tools secured to said arms in position to dress opposite sides of a grinding wheel, respectively, a reciprocable piston mounted between said shafts, means operatively connecting said piston to the two shafts to move the shafts in opposite directions on movement of the piston, a third shaft operatively connected to the piston for movement about an axis extending at right angles to the plane of the axes of the other two shafts, a dressing tool secured to said last named shaft in position to dress the tip of the grinding wheel and rounds at the junctures of the tip with opposite sides of the wheel, and means for applying fluid pressure selectively to opposite sides of the piston to swing the dressing tools across the sides and tip of the wheel.

8. In a grinding machine, a support, a spindle journaled in the support, a grinding wheel secured to the spindle, a carriage movably mounted on the support at one side of the wheel, a plurality of arms reciprocably mounted on the carriage, dressers mounted on two of said arms for dressing opposite sides, respectively, of the wheel, a dresser mounted on a third arm for dressing the tip of the wheel, means for moving the carriage to move the dressers from an inoperative position clear of the wheel to operative position to permit the dressers to engage the wheel, and means for reciprocating said arms to effect dressing, said arms being so mounted on said carriage that the dresser, which dresses the side of the wheel that is more remote from the carriage, moves from the tip of the active portion of said side of the wheel to the base thereof and back again in a cycle of its reciprocation, while the dresser, which dresses the side of the wheel that is nearer the carriage, moves from the base of the active portion of said side of the wheel to the tip thereof and back again in a cycle of its reciprocation, while the dresser, which dresses the tip of the wheel, moves from the side of the wheel nearer the carriage to the side of the wheel more remote from the carriage and back again in the cycle of its reciprocation.

9. In a grinding machine, a support, a spindle journaled in the support, a grinding wheel secured to the spindle, a carriage movably mounted on the support at one side of the wheel, a plurality of arms reciprocably mounted on the carriage, dressers mounted on two of said arms for dressing opposite sides, respectively, of the wheel, a dresser mounted on a third arm for dressing rounds at the junctures of the sides of the wheel with its tip, said last named arm being reciprocable on the carriage about a relatively fixed axis, means for moving the carriage to move the dressers from inoperative position clear of the wheel to operative position to permit the dressers to engage the wheel, means for reciprocating said arms to effect dressing, said arms being so mounted on said carriage that the dresser, which dresses the side of the wheel, that is more remote from the carriage, moves from the tip of the active portion of said side of the wheel to the base thereof and back again in a cycle of its reciprocation, while the dresser, which dresses the side of the wheel that is nearer the carriage, moves from the base of the active portion of said side of the wheel to the tip thereof and back again in a cycle of its reciprocation, while the dresser which dresses the rounds on the wheel, moves across the tip of the wheel from the side of the wheel nearer the carriage to the side of the wheel more remote from the carriage and back again in a cycle of its reciprocation, and a fourth dresser mounted on the same arm with the first described dresser in such position that, when said arm has completed the cycle of its movement, the fourth dresser is in position to be passed across the tip of the wheel by the movement of the carriage itself to inoperative position.

10. In a grinding machine, a support, a spindle journaled in the support, a grinding wheel secured to the spindle, a carriage reciprocable on the support, a shaft journaled in said carriage, a pair of dressers mounted on said shaft to project therefrom at angles to one another, means for rocking the shaft to move one of the dressers across a side of the wheel to dress the same, and means for moving the carriage to cause the other dresser to dress the tip of the wheel.

11. In a grinding machine, a support, a spindle journaled in the support, a grinding wheel secured to the spindle, a guard for enclosing the grinding wheel and comprising a fixed portion and a movable shutter, a carriage reciprocably mounted on the support, dressing mechanism mounted on the carriage, means for moving the carriage to move the dressing mechanism from inoperative position clear of the wheel to operative position to engage the wheel, and means responsive to the movement of the carriage to open the shutter on movement of the dressing mechanism to operative position and close the shutter on movement of the dressing mechanism to inoperative position.

12. In a grinding machine, a support, a spindle journaled in the support, a grinding wheel secured to the spindle, a carriage mounted on the support, dressing mechanism mounted on the carriage and comprising a pair of dressing tools, means for moving the carriage on the support to move the dressing mechanism to and from operative relation with the wheel, means for moving one of the tools independently of the movement of the carriage to effect dressing movement of the tool, said other tool being so mounted as to dress the wheel by movement of the carriage itself, means for controlling the speed of the movement of the carriage, and means operatively connecting the last named means to the carriage to actuate the last named means on movement of the carriage.

13. Mechanism for dressing a rotary grinding wheel comprising a support, a pair of dressing tools movably mounted on said support, means for moving one of the tools in an arcuate path across the tip of the wheel from one side of the wheel to the other to dress an arcuate shape on the tip of the wheel with rounds connecting the sides with the tip, and means for subsequently moving the other dressing tool automatically in a straight path across the tip of the wheel to re-dress the tip of the wheel and form a straight profiled tip thereon.

14. Mechanism for dressing a rotary grinding wheel comprising a support, a carriage movable on the support, a dressing tool fixedly secured to the carriage, a second dressing tool movably mounted on the carriage, means for moving the second dressing tool in an arcuate path across the tip of the wheel from one side of the wheel to the other to dress an arcuate shape on the tip of the wheel with rounds connecting the sides with the tip, and means for subsequently moving the carriage to move the other dressing tool in a straight path across the tip of the wheel to dress a straight tip on the wheel.

15. In a machine for grinding gears, a support, a spindle journaled in said support, a grinding wheel secured to said spindle, a slide reciprocably mounted on the support for movement radially of the axis of the spindle, an adjustable stop for limiting movement of the slide radially toward the spindle, a block mounted on the slide for adjustment in a direction at right angles to the direction of movement of the slide, a carrier journaled in the block for angular adjustment about an axis extending in the direction of movement of the slide, a second block mounted on the carrier for angular adjustment about an axis extending at right angles to the axis of adjustment of the carrier, a dressing tool oscillatably mounted on the second block and arranged to dress a side surface of the wheel, a second carrier adjustable on the second block in a direction parallel to the direction of movement of the slide, a second dressing tool oscillatably mounted on said second carrier for swinging movement about an axis inclined to the axis of oscillation of the first dressing tool to dress the tip surface of the wheel and rounds joining the tip surface with the sides of the wheel, and means for oscillating said dressing tools.

16. Mechanism for dressing a rotary grinding wheel comprising a support, a pair of shafts journaled in said support with their axes lying in the same plane but inclined to one another at an angle equal to the included angle between opposite side surfaces of the wheel to be dressed, an arm secured to each of said shafts, a dressing tool secured to each of said arms in position to dress opposite sides of the wheel, respectively, a third shaft journaled in said support with its axis parallel to the plane of the first shaft but offset therefrom, a fourth shaft operatively connected to the third shaft and having its axis at right angles to the axis of the third shaft, an arm secured to the fourth shaft, a dressing tool secured to said arm in position to move across the top surface of the wheel from one side thereof to the other on rotation of the fourth shaft, and means for oscillating said shafts comprising a piston mounted on said support between the first two shafts, a pair of racks secured to opposite sides of said piston, spur gears secured to each of the first two shafts and meshing with said racks, a third rack secured to the piston, a spur gear secured to the third shaft and meshing with the third rack, and means for applying fluid pressure selectively to opposite sides of the piston.

17. In a machine for grinding gears in a generating operation, a cradle, a housing on which the cradle is oscillatably mounted, a carrier adjustable about the axis of the cradle, a grinding wheel journaled in the carrier, a bracket secured at one end to the carrier for adjustment angularly thereon about the axis of the grinding wheel, a pin mounted on the housing for adjustment about the axis of the cradle and adapted to engage in an elongated slot, which is formed in the bracket and which extends radially of the wheel axis, to support the opposite end of the bracket, and mechanism for dressing the grinding wheel mounted on the bracket for movement thereon to and from operative relation with the wheel.

18. In a grinding machine, a support, a spindle journaled in the support, a grinding wheel secured to the spindle, a carriage movable on the support, a dresser mounted on the carriage, fluid pressure operated means for actuating said carriage to effect a dressing operation comprising a cylinder and a piston reciprocable therein, one of which is connected to the support and the other to the carriage, ducts for conducting the pressure fluid to opposite sides of the piston, a check valve mounted in one of said ducts to be opened when said duct is on supply to allow free flow of the pressure fluid through said duct but to be closed when said duct is on exhaust, a third duct connected to the said duct to conduct the exhaust fluid therefrom when the check valve is closed, and an adjustable throttle valve in the third duct to govern the rate of flow of the exhaust fluid through the third duct whereby to control the rate of movement of the dressing tool in one direction of its movement.

19. In a grinding machine, a support, a spindle journaled in the support, a grinding wheel secured to the spindle, a carriage movably mounted on the support, dressing mechanism movably mounted on the carriage, fluid pressure operated means for reciprocating the carriage to move the dressing mechanism to and from operative relation with the wheel, fluid pressure operated means for moving the dressing mechanism, when it is in operative position to effect the dressing operation, a single control valve for the two fluid pressure operated means, said valve being so constructed that on movement step-by-step in one direction the carriage is first moved to carry the dressing mechanism into operative position and then the dressing mechanism is moved in one direction across the surface of the wheel to be dressed, and on movement of said valve in the opposite direction the dressing mechanism is first moved in the opposite direction across the surface of the wheel to be dressed, and then the carriage is withdrawn to inoperative position.

20. In a grinding machine, a support, a grinding wheel journaled on said support, a carriage reciprocable on said support, fluid pressure operated means for reciprocating said carriage, a pair of dressing tools mounted on said carriage, one of which is relatively fixed to the carriage in position to be operated by the movement of the carriage itself, and the other of which is mounted on the carriage to be movable independently thereof, fluid pressure operated means for reciprocating the second dresser, and a single throttle valve operatively connected to both said fluid pressure operated means for controlling the rate of movement in one direction of both fluid-pressure operated means whereby to control the rate of operation in one direction of both dressers.

21. In a grinding machine, a support, a spindle journaled in the support, a grinding wheel secured to the spindle, a carriage mounted on the support, a dressing mechanism mounted on the carriage comprising a pair of dressing tools, one of which is movably mounted on the carriage and the other of which is secured to the carriage in fixed relation thereto, means for moving the first dressing tool back and forth across the wheel when it is in operative position, to dress the wheel, means for advancing the wheel axially between the said movements of the first tool, and means for moving the carriage on the support to carry both tools to and from operative position and to cause the second tool to dress the wheel on movement of the carriage from operative position.

22. In a grinding machine, a support, a spindle journaled in the support, a rotary annular grinding wheel secured to the spindle, a carriage mounted on the support for movement in a direction perpendicular to the axis of the wheel, dressing mechanism mounted on the carriage and comprising a pair of dressing tools, one of which is movably mounted on the carriage to dress a side of the wheel and the other of which is secured to the carriage in fixed relation thereto to dress the tip of the wheel, means for moving the first tool back and forth across the wheel when in operative position, means for advancing the wheel axially between the said movements of the first tool, and means for moving the carriage on the support to move both dressing tools to and from operative position and to cause the second tool to dress the wheel on movement of the carriage from operative position.

23. In a grinding machine, a support, a spindle journaled in the support, a grinding wheel secured to the spindle, a carriage reciprocable on the support, a dressing tool fixedly secured to the carriage in position to dress a surface of the wheel, a second dressing tool movably mounted on the carriage in position to dress a different surface of the wheel, means for moving the carriage at high speed in opposite directions to move the tools to and from operative relation with the wheel, means for moving the second tool at a relatively fast speed in one direction and at a relatively slow speed in the opposite direction, while in operative position, to cause it to rough-dress and finish-dress a wheel surface successively, and means for decelerating the speed of movement of the carriage during part of its movement in one direction, while the first tool is dressing the wheel, to cause said first tool to finish-dress the wheel surface.

24. In a grinding machine, a support, a spindle journaled in the support, a grinding wheel secured to the spindle, a carriage reciprocable on the support, a dressing tool fixedly secured to the carriage in position to dress a surface of the wheel, a second dressing tool movably mounted on the carriage in position to dress a different surface of the wheel, fluid-pressure operated means for moving the carriage in opposite directions to move the tools to and from operative relation with the wheel, fluid-pressure operated means for reciprocating the second dressing tool to cause it to dress the wheel, an adjustable throttle valve for governing the rate of return movement of the second dressing tool so as to cause it to travel at a slower speed on its return movement than on its forward movement, and means operated by the carriage in its return movement for operatively connecting the throttle valve to the fluid-pressure operated means for actuating the carriage, whereby the rate of return movement of the carriage is decelerated during the time the first dressing tool is dressing the wheel on the return movement of the carriage.

25. In a grinding machine, a support, a spindle journaled in the support, a grinding wheel secured to the spindle, a carriage movable on the support, a dressing tool mounted on the carriage, fluid-pressure operated means for moving the carriage to effect a dressing operation comprising a cylinder and a piston reciprocable therein, one of which is connected to the support and the other to the carriage, a reverse valve for controlling the direction of application of fluid-pressure to the piston, a shuttle valve, a duct connecting the reverse valve with one side of the piston, a duct connecting the other side of the piston with the shuttle valve, two ducts connecting the shuttle valve with the reverse valve, means constantly urging the shuttle valve in one direction to connect one of the two ducts with the duct that leads from the shuttle valve to one side of the piston, means actuated by the carriage at a predetermined point in its movement in one direction for shifting said shuttle valve against the resistance of the last named means to connect the other of said two ducts with the duct that leads from the shuttle valve to one side of the piston, and a throttle valve for controlling the flow of fluid from the latter of the two ducts to the reverse valve, whereby during movement of the carriage in one direction its speed is decelerated for dressing.

26. In a grinding machine, a support, a spindle journaled in the support, a grinding wheel secured to the spindle, a carriage movable on the support, a dressing tool fixedly secured to the carriage in position to dress a surface of the wheel, a second dressing tool movably mounted on the carriage in position to dress a different surface of the wheel, fluid-pressure operated means for moving the carriage to move the dressing tools into and out of operative relation with the wheel comprising a cylinder and a piston reciprocable therein, one of which is connected to the support and the other to the carriage, means for actuating the second dressing tool when in operative position, comprising a cylinder and a piston reciprocable therein, one of which is connected to the second dressing tool and the other to the carriage, a single reverse valve for controlling the direction of flow of the motive fluid to both cylinders, a throttle valve for controlling the rate of flow of the exhaust fluid from the second cylinder during movement of the second dressing tool in one direction, and means operable by the carriage during part of the return movement of the carriage while the first dressing tool is in engagement with the wheel, to connect the flow of the exhaust fluid from the first cylinder with the exhaust fluid flowing from the second cylinder so that the rate of movement of the carriage during said part of the return movement of the carriage is controlled by said throttle valve.

LEONARD O. CARLSEN.